United States Patent Office 3,436,715

Patented Apr. 1, 1969

3,436,715

CONNECTORS FOR USE WITH FLEXIBLE PRINTED CIRCUITS

Benjamin William Matthews, Birmingham, England, assignor to Joseph Lucas (Industries) Limited, Birmingham, England, a British company Filed Sept. 21, 1966, Ser. No. 580,956
Claims priority, application Great Britain, Oct. 14, 1965, 43,575/65
Int. Cl. H05k *1/12;* H01r *13/54*
U.S. Cl. 339—17 2 Claims

ABSTRACT OF THE DISCLOSURE

In a connector for a printed circuit, portions of the printed circuit are exposed on a board to which a frame is secured. The frame has a shoulder beneath which one end of a body is trapped, the other end of the body being secured to the frame by latch means including a post on the body and a slot in the frame, the arrangement being such that when the body is engaged with the frame conductors detachably engaged with the body make connections to the exposed portions of the printed circuit.

This invention relates to connectors for use with printed circuits, particularly flexible printed circuits.

A connector according to the invention comprises in combination a frame adapted to be secured to a printed circuit board or, in the case of a flexible printed circuit to a base member over which an exposed portion of the flexible printed circuit passes, a body detachably engaged with the frame, and one or more conductors detachably engaged with the body and serving when the body is engaged with the frame to make connections to the printed circuit.

Figure 1:
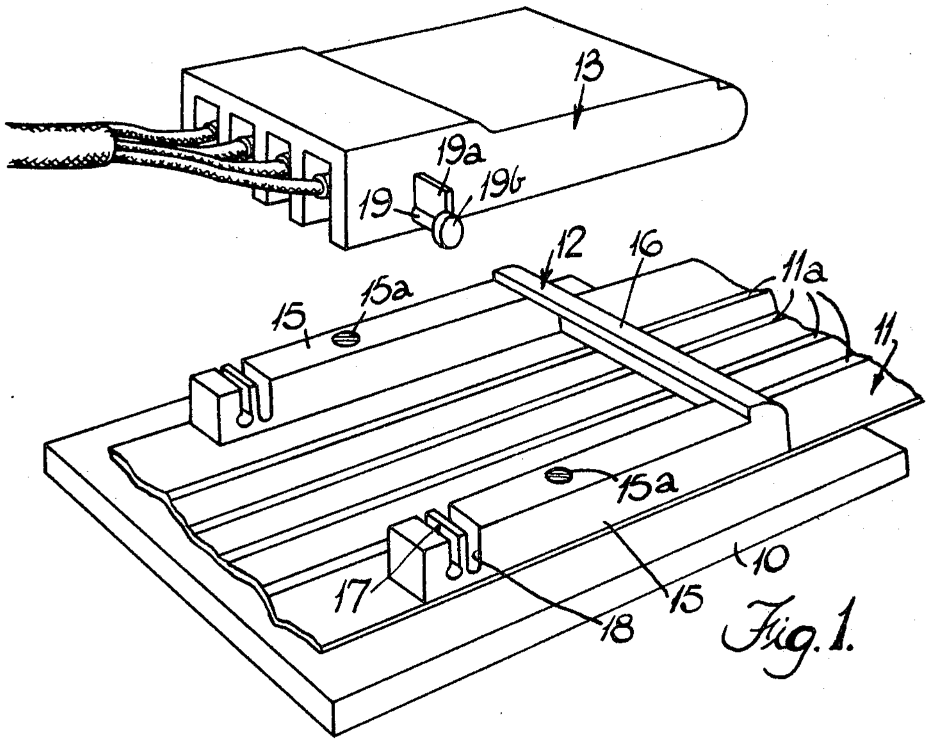
FIGURE 1 is an exploded perspective view of a connector in accordance with one example of the invention.
Figure 2:
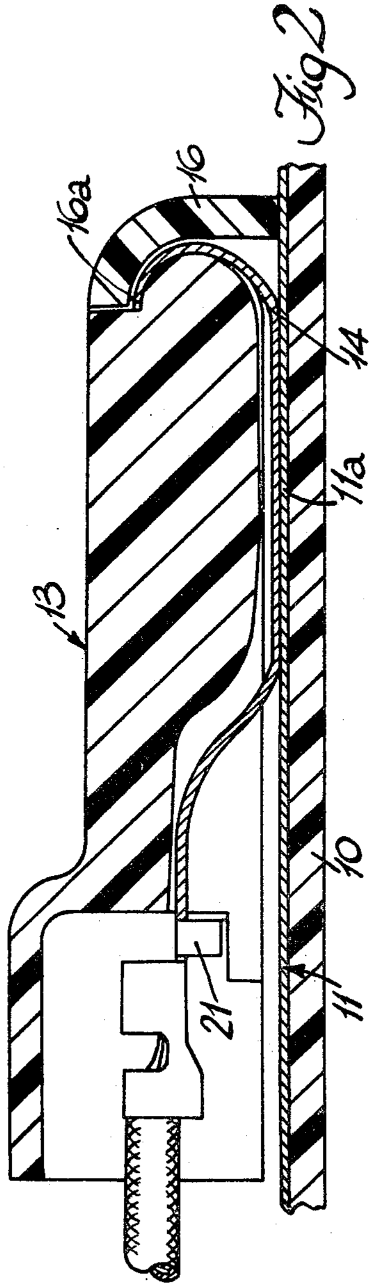
FIGURE 2 is a sectional view of the connector in FIGURE 1 assembled.

Referring first to FIGURES 1 and 2, there is provided a base member 10 over which a flexible printed circuit 11 passes. Secured to the base member is a frame 12 to which is detachably secured a body 13. The body 13 has a plurality of conductors 14 detachably connected thereto, and the arrangement is such that when the frame 12 is secured to the base member 10 and the body 13 is engaged with the frame 12, the conductors 14 will contact exposed portions 11*a* of the flexible printed circuit 11 to provide connections thereto.

The frame 12 is formed as a synthetic resin moulding and includes a pair of parallel arms 15 interconnected at one end by an end wall 16, shaped to define a shoulder 16*a* the arms 15 being formed with holes 15*a* for receiving bolts through which the frame is secured to the base member. Each arm is formed with a locating slot 17, and a further slot 18 which serves to render one wall of the slot 17 flexible.

The body 13 is also formed as a synthetic resin moulding, and incorporates a pair of outwardly extending pins 19, each pin being strengthened by a rib 19*a* integral with the pin 19 and the body 13. The arrangement being such that one end of the body 13 can be engaged under the shoulder 16*a* of the frame 12, and then moved angularly towards the plane of the base member 10 to cause the pins 19 to engage in the slots 17, thereby locating the body relative to the frame. To ensure accurate location of the body 13 within the frame 12, the pins 19 are formed with enlarged heads 19*b* which engage the outer surfaces of the arms 15 when the pins 19 are engaged in the slots 17. In the body are a plurality of channels equal in number to the number of connections to be made to the flexible printed circuit, the conductors 14 being detachably engaged within the channels, and held in position by ears 21 on the conductor engaging portions of the body 12.

Figure 3:
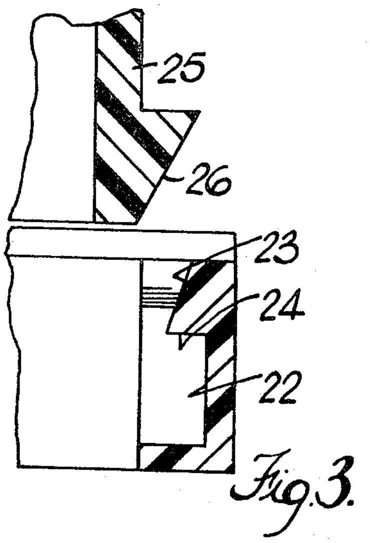
FIGURE 3 is a fragmentary sectional view of a modification of the connector in FIGURE 1..

In the modification in FIG. 3 each of the arms 15 is formed on its inner surface with a groove 22 the base of which is shaped to define a ramp 23 terminating at a shoulder 24. The body 13 is formed with a pair of resilient flanges 25 which carry outwardly directed lugs 26. The arrangement is such that when the body and the frame are engaged and the body is moved angularly towards the plane of the base then the lugs 26 will ride on the ramps 23 thereby flexing the flanges 25 inwardly until the lugs 25 engage behind the shoulders 24 to maintain the body in position. To release the body from the frame the flanges 25 must be flexed inwardly until the lugs 25 clear the shoulders 24, and the body 13 can be moved angularly away from the base 10.

Having thus described my invention what I claim as new and desire to secure by Letters Patent is:

1. A connector for use with printed circuits, comprising in combination a board having thereon exposed circuit portions, a frame secured to said board, a body detachably engaged with the frame, said frame including a shoulder beneath which one end of the body is trapped, and one of the parts constituted by said body and said frame having a post engaging a first slot on the other of said parts constituted by the body and the frame, the slot including a narrow neck and a wider base and the narrow neck being capable of being deformed to allow passage of the post through the neck into engagement with the base of the slot, and one or more conductors detachably engaged with the body and serving when the body is engaged with the frame to make connections to said exposed circuit portions.

2. A connector as claimed in claim 1 wherein the post is provided on the body and the slot is provided in the frame and wherein the frame is provided with a second slot adjacent the first slot, the portion of the frame between the two slots being flexible to allow the post to engage the base of the first slot.

References Cited

UNITED STATES PATENTS

| | | | |
|---|---|---|---|
| 2,891,103 | 6/1959 | Swengel | 339—91 |
| 2,899,669 | 8/1959 | Johanson. | |
| 3,116,960 | 1/1964 | Olsson et al. | 339—128 |
| 3,154,365 | 10/1964 | Crimmins | 339—91 XR |
| 3,200,364 | 8/1965 | Forney. | |
| 3,319,216 | 5/1967 | McCullough. | |

FOREIGN PATENTS

| | | | |
|---|---|---|---|
| 700,490 | 12/1953 | Great Britain. | |

MARVIN A. CHAMPION, *Primary Examiner.*

P. A. CLIFFORD, *Assistant Examiner.*

U.S. Cl. X.R.

339—91